United States Patent
Endo

(10) Patent No.: US 7,447,420 B2
(45) Date of Patent: Nov. 4, 2008

(54) RECORDING APPARATUS FOR RECORDING ENCODED DATA TOGETHER WITH SYNC DATA

(75) Inventor: Hiroaki Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 10/706,942

(22) Filed: Nov. 14, 2003

(65) Prior Publication Data

US 2004/0101277 A1    May 27, 2004

(30) Foreign Application Priority Data

Nov. 22, 2002    (JP)    ............................. 2002-339760

(51) Int. Cl.
*H04N 7/26*    (2006.01)
(52) U.S. Cl. .......................... 386/111; 386/46; 386/112
(58) Field of Classification Search .................. 386/46, 386/111, 112
See application file for complete search history.

(56) References Cited

U.S. PATENT DOCUMENTS

| | | | | |
|---|---|---|---|---|
| 5,949,953 A | * | 9/1999 | Shirakawa et al. ............ | 386/70 |
| 6,026,212 A | * | 2/2000 | Oguro ......................... | 386/67 |
| 6,038,345 A | * | 3/2000 | Osawa et al. ................ | 382/232 |
| 2001/0036357 A1 | | 11/2001 | Tauchi et al. .................. | 386/95 |
| 2001/0055473 A1 | * | 12/2001 | Tauchi et al. .................. | 386/95 |
| 2003/0117835 A1 | * | 6/2003 | Itoh et al. .................... | 345/204 |

FOREIGN PATENT DOCUMENTS

| | | |
|---|---|---|
| JP | 2000-270576 | 9/2000 |
| JP | 2001-275077 | 10/2001 |

* cited by examiner

*Primary Examiner*—Thai Tran
*Assistant Examiner*—Girumsew Wendmagegn
(74) *Attorney, Agent, or Firm*—Fitzpatrick, Cella, Harper & Scinto

(57) ABSTRACT

A recording apparatus for encoding an inputted image signal by a plurality of different encoding methods to record it, wherein sync data having a pattern corresponding to a selected one of the plurality of encoding methods is formed, a plurality of sync blocks are formed by adding the sync data corresponding to the selected encoding method to each of a predetermined amount of the encoded image data encoded by the selected encoding method, and an encoded data stream constructed by the plurality of sync blocks is recorded onto a recording medium.

15 Claims, 4 Drawing Sheets

RECORDING APPARATUS FOR RECORDING ENCODED DATA TOGETHER WITH SYNC DATA

BACKGROUND OF THE INVENTION

1. Field of the Invention

The invention relates to an apparatus for forming a number of sync blocks to recording and reproducing digital data.

2. Related Background Art

Hitherto, a DV (Digital Video) format specified by the HD Digital VCR Council has been known as a system for recording video data onto a magnetic tape. According to the DV format, as shown in FIG. 5A, digital data is recorded by forming a number of helical tracks onto a tape T. As shown in FIG. 5B, each track is constructed by an ITI (Insert and Track Information) sector, an audio sector, a video sector, and a subcode sector. A rotary head records the data into each sector while tracing the track in the direction shown by an arrow A. At this time, a plurality of sync blocks are formed by adding a predetermined sync pattern to a predetermined amount of the digital data, and the data is recorded into each sector on a sync block unit basis. Gaps are formed between the ITI sector and the audio sector, between the audio sector and the video sector, and between the video sector and the subcode sector, respectively.

According to the DV format, as mentioned above, since a plurality of gaps are formed and a preamble and a postamble are further formed in each sector, there is a problem such that a recording rate of the substantial data cannot be sufficiently obtained. As a method of solving such a problem, a method whereby no gap is provided for each track but a conventional gap area is used as a data area has been disclosed in Japanese Patent Application Laid-Open No. 2000-270576.

Further, a method whereby the ITI sector is constructed only by the preamble, thereby widening the data area more, has also been disclosed in Japanese Patent Application Laid-Open No. 2001-275077. A format according to such a method is referred to as an "HD format" hereinbelow. A construction of one track in the HD format is shown in FIG. 5C.

When the data recorded as mentioned above is reproduced, it is necessary to detect whether the data recorded on the tape is the data in the HD format or the data in the DV format, to switch a process for the data. Therefore, in the apparatus disclosed in the above Official Gazette, the DV format is detected by detecting APT2, APT1, and APT0 data recorded in the ITI sector while the HD format is detected by detecting an ID of a main sector or an ID of the subcode sector.

However, according to such a method, it is necessary to reproduce the data in different portions on the tracks recorded on the magnetic tape and discriminate an encoding method of the recorded data. There is, consequently, a problem such that complicated processes are required to discriminate the encoding method.

SUMMARY OF THE INVENTION

It is an object of the invention to solve such problems.

Another object of the invention is to discriminate an encoding method of recorded data by a simple method while assuring a large effective data area onto a magnetic tape.

To accomplish the above objects, according to one aspect of the invention, a recording apparatus of the present invention, for encoding image data to record it onto a recording medium, comprising:

encoding means for encoding an inputted image signal by a plurality of different encoding methods to form a plurality of encoded image data;

sync data generating means for generating a plurality of sync data having different patterns respectively corresponding to the plurality of encoding methods;

control means for controlling the sync data generating means so as to output the sync data having the pattern corresponding to a selected one of the plurality of encoding methods; and recording means for forming a plurality of sync blocks by adding the sync data corresponding to the selected encoding method to each of a predetermined amount of the encoded image data encoded by the selected encoding method and recording an encoded data stream constructed by the plurality of sync blocks onto the recording medium.

The above and other objects and features of the present invention will become apparent from the following detailed description and the appended claims with reference to the accompanying drawings.

DETAILED DESCRIPTION OF THE PREFERRED EMBODIMENT

A preferred embodiment of the invention will be described in detail hereinbelow with reference to the drawings.

Figure 1:
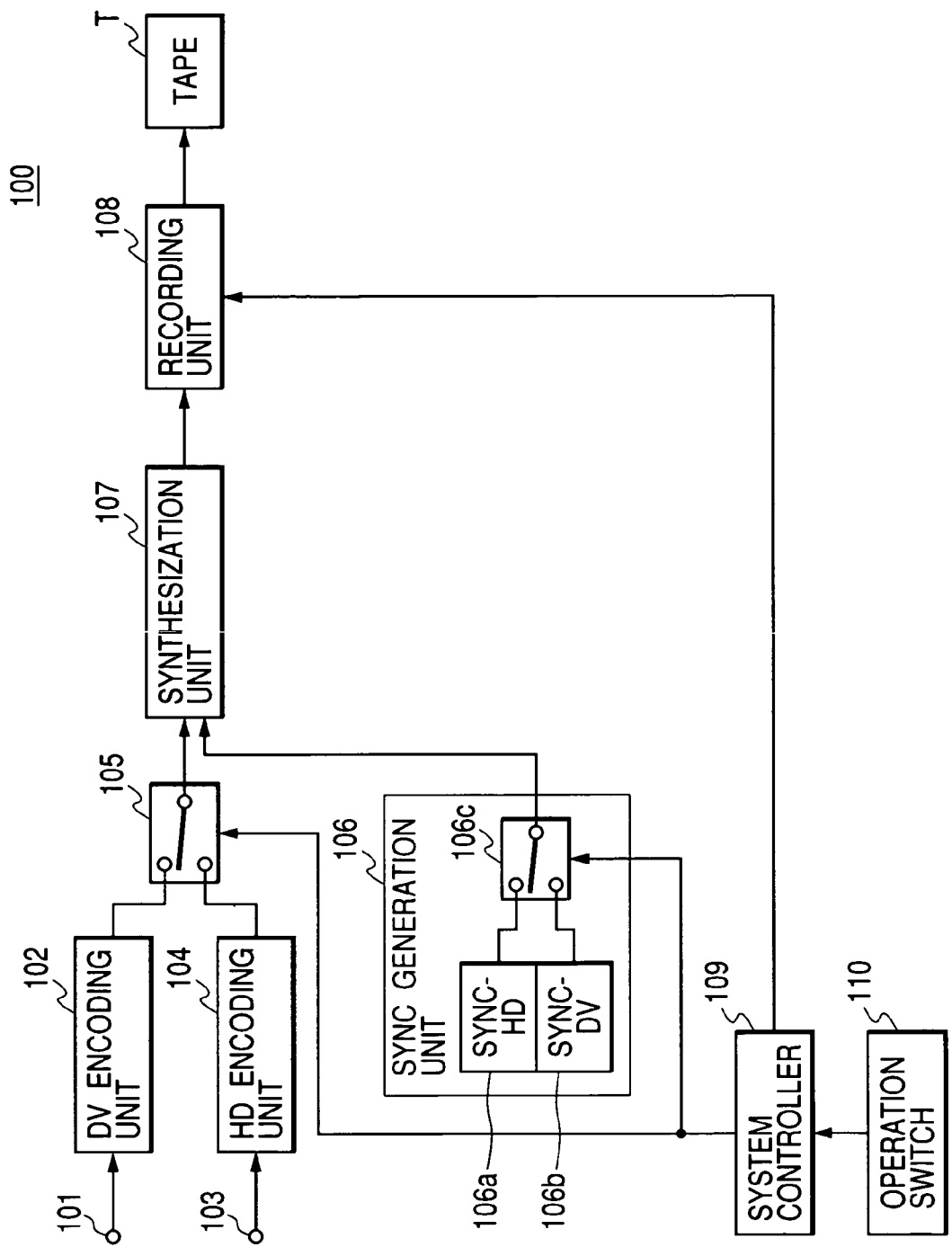
FIG. 1 is a block diagram showing a construction of a recording system of a recording and reproducing apparatus according to an embodiment of the invention.

FIG. 1 is a diagram showing an example of a construction of a recording system of a recording and reproducing apparatus 100 according to the embodiment of the invention.

In FIG. 1, reference numeral 101 denotes a terminal for inputting an SD (Standard Definition) video signal of standard quality; 102 a DV encoding unit for encoding the inputted SD video signal by a DV system using an intraframe encoding method (hereinafter, such encoding is referred to as "DV encoding") to compress an information amount; 103 a terminal for inputting an HD video signal of high quality; 104 an HD encoding unit for encoding the inputted HD video signal by an MPEG system such as MP@HL system, MP@H-14 system, or the like (hereinafter, such encoding is referred to as "HD encoding") to compress an information amount; 105 a switch for switching a connection in accordance with a selection signal of the encoding method, which is sent from a system controller 109; 106 a sync generation unit for selectively generating either sync data having a sync pattern for the HD encoding data or sync data having a sync pattern for the DV encoding data in accordance with an instruction from the system controller 109; 107 a synthesization unit for forming a sync block by adding the sync data from the sync generation unit 106 to each of a predetermined amount of data outputted from the switch 105 to convert it into a data format suitable to be recorded onto the magnetic tape T; 108 a recording unit for recording the data which is outputted from the synthesization unit 107 onto the magnetic tape T; 109 the system controller for controlling each unit in accordance with an instruction of an operation switch 110; and 110 the operation switch having various switches such as recording trigger switch, HD/DV mode change-over switch, and the like.

The recording operation which is executed by the recording system in FIG. 1 will be described in detail hereinbelow.

When the operation switch 110 is operated by the user and start of recording is instructed with a recording mode of either an HD mode or a DV mode being selected, the system controller 109 outputs the selection signal indicative of the encoding method according to the selected recording mode to the switch 105. When the selection signal indicates the DV system, the DV encoding unit 102 encodes an inputted SD video image by a predetermined method and outputs the DV encoded data. The switch 105 connects to the DV encoding unit 102 in accordance with the selection signal and outputs the DV encoded data.

The system controller 109 also outputs the selection signal to a switch 106c of the sync generation unit 106. In response to the selection signal, the sync generation unit 106 selects and outputs the sync data of the sync pattern corresponding to the DV system obtained by a sync data generation unit for DV (Sync-DV) 106b.

Figure 5A:
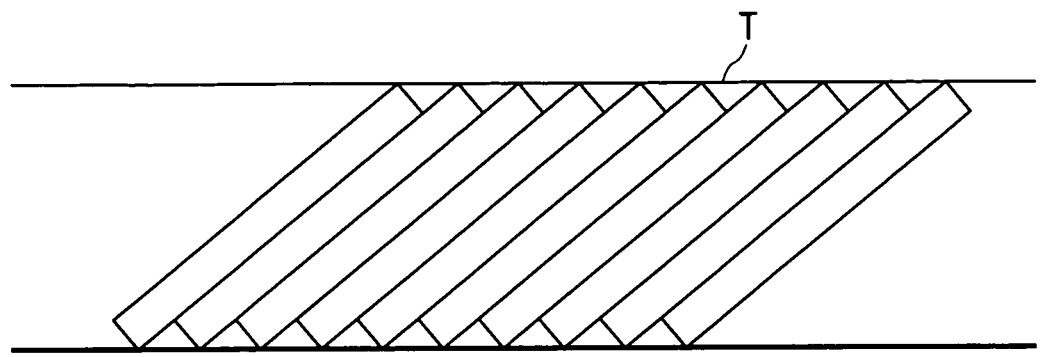
FIGS. 5A, 5B and 5C are diagrams showing data formats of the DV system and the HD system.
Figure 5B:
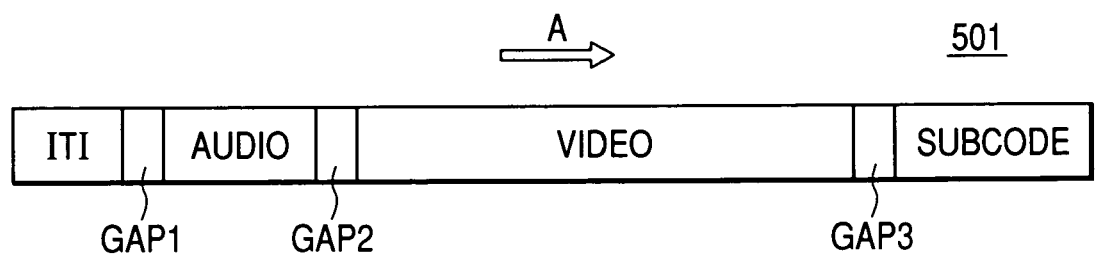

The synthesization unit 107 divides the DV encoding data which is outputted from the switch 105, on an n-byte unit basis to execute an error correction encoding process. After that, the synthesization unit 107 forms a sync block by adding ID data as identification data of each sync block and the sync data for the DV system which is generated from the sync generation unit 106, to the encoding data of n bytes, and outputs the resultant sync block to the recording unit 108. The recording unit 108 forms a number of helical tracks onto the tape T by a rotary head as shown in FIG. 5A and records the encoding data outputted from the synthesization unit 107 onto each track on a sync block unit basis as shown in FIG. 5B.

Figure 2:
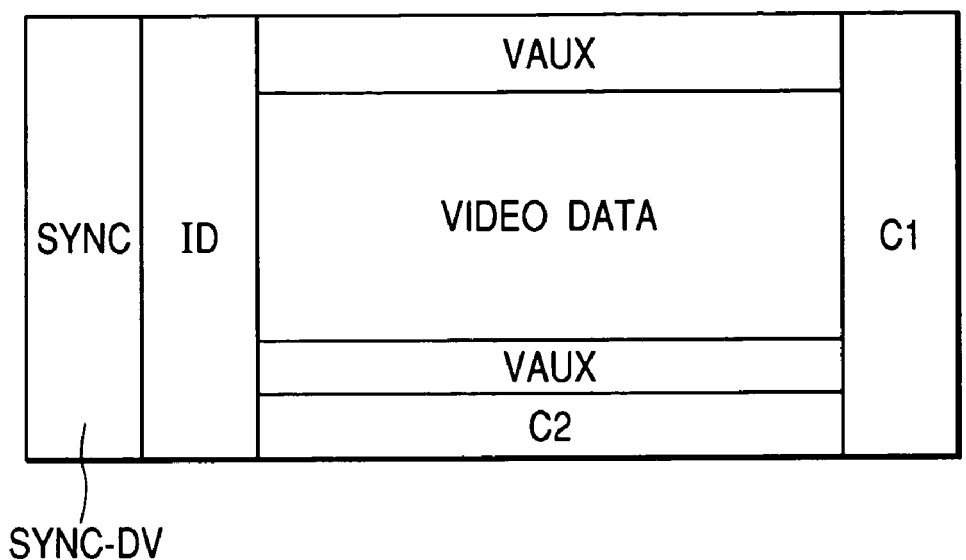
FIG. 2 is a diagram showing a detailed construction of a video sector of a DV system.

In the embodiment, a construction of the data of the DV format, which is recorded into the video sector of one track, is shown in FIG. 2. A construction of the sector in the track of the DV format is similar to that shown in FIG. 5B.

As shown in FIG. 2, the error correction encoding process having a product code construction is performed on data of n bytes×m bytes, in which video auxiliary data (VAUX) is divided on an n-byte unit basis for video data of one track. A sync block is formed by adding the sync data having the sync pattern specified in the DV system to each row.

When there is the selecting instruction of the HD mode by the operation switch 110, the HD encoding unit 104 encodes the inputted HD video signal by the MPEG system such as MP@HL method, MP@H-14 method, or the like and outputs the HD encoding data. The system controller 109 outputs the selection signal to the switch 105 to output the HD encoding data from the HD encoding unit 104.

The system controller 109 also outputs the selection signal to the switch 106c. By this selection signal, the sync generation unit 106 selects the sync data of the sync pattern corresponding to the HD encoding method, obtained by a sync data generation unit for HD (Sync-HD) 106a and outputs it. It is assumed that the sync pattern for the HD system which is generated here is different from that for the DV system.

Figure 5C:
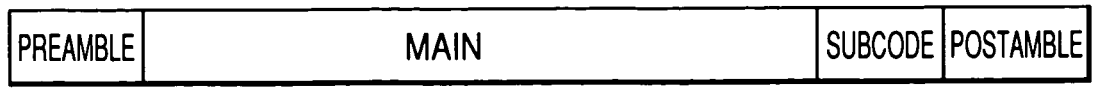

The synthesization unit 107 performs the error correction encoding process on the HD encoding data outputted from the switch 105, thereafter, forms a sync block by adding the ID data and the sync data for the HD system from the sync generation unit 106, and outputs the resultant sync block to the recording unit 108. The recording unit 108 forms a number of helical tracks onto the tape T by the rotary head as shown in FIG. 5A and records the encoding data outputted from the synthesization unit 107 onto each track on a sync block unit basis as shown in FIG. 5C.

Figure 3:
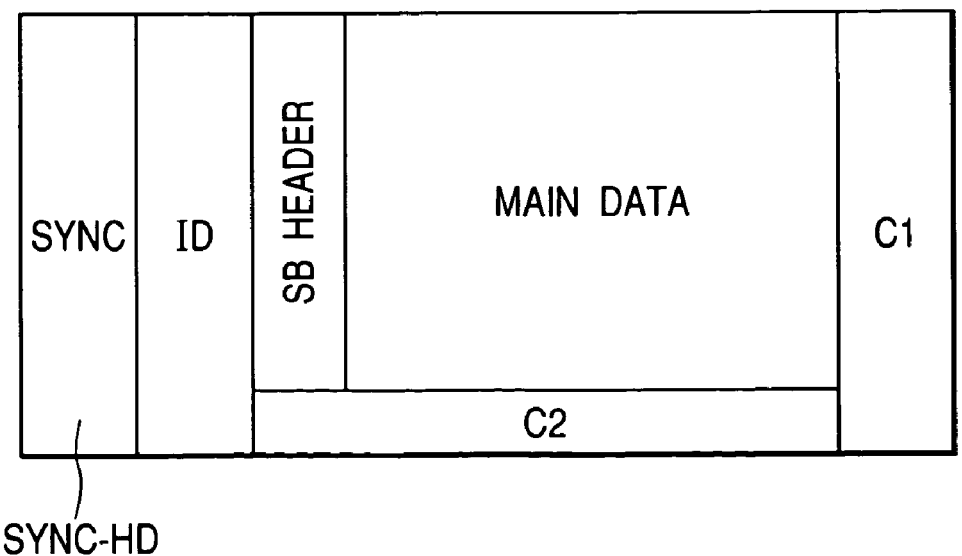
FIG. 3 is a diagram showing a detailed construction of a main sector of an HD system.

In the embodiment, a construction of the data of the HD format which is recorded into the main sector of one track is shown in FIG. 3. A construction of the sector in the track of the HD format is similar to that shown in FIG. 5C.

As shown in FIG. 3, an error correction encoding process having a product code construction is performed on data of n bytes×m bytes, in which a sync block header is added to the HD-encoded data of one track. A sync block is formed by adding the sync data having the sync pattern specified in the HD system to each row. The sync pattern for the HD system is different from that specified in the DV system.

Figure 4:
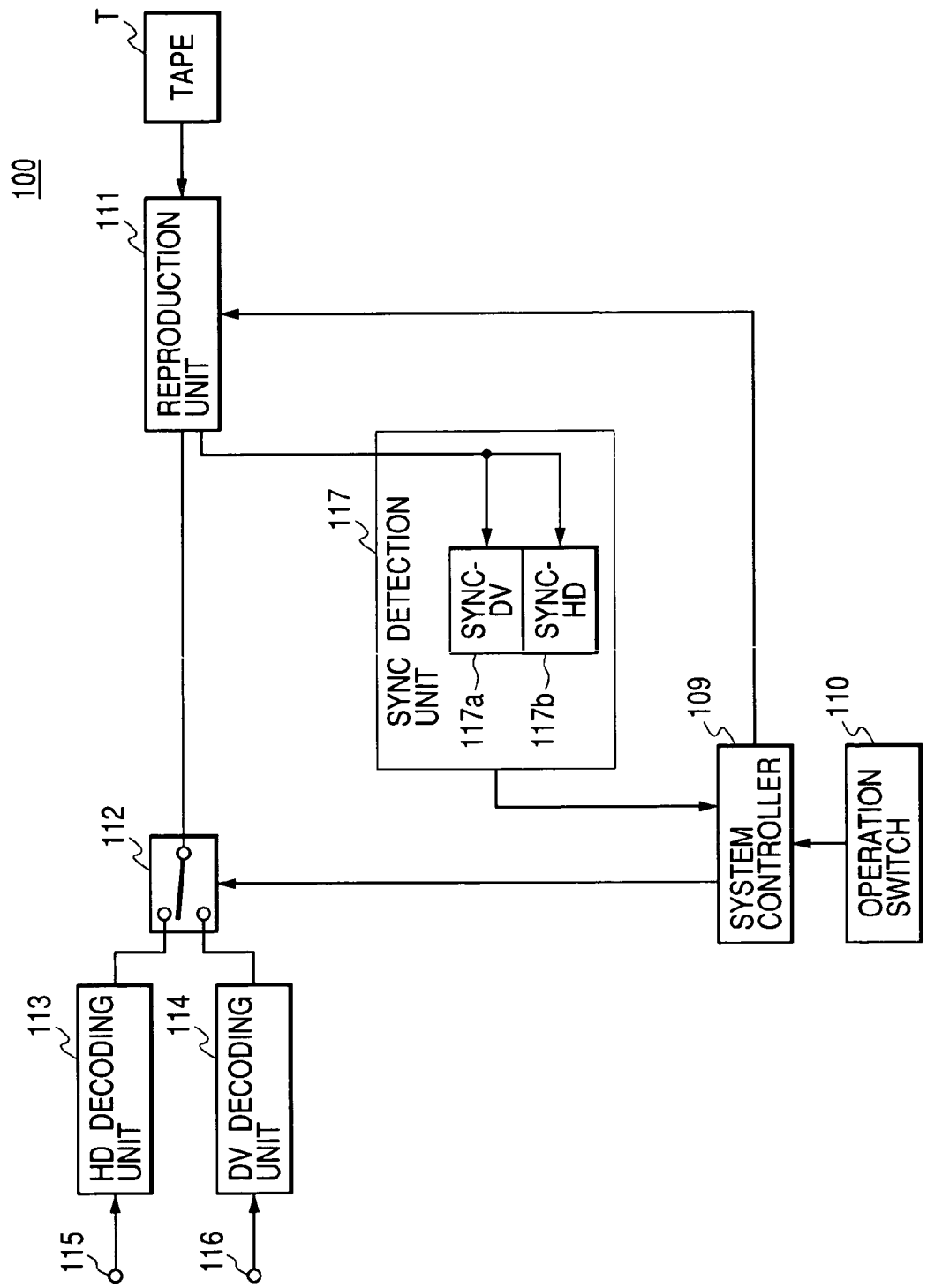
FIG. 4 is a block diagram showing a construction of a reproducing system of the recording and reproducing apparatus according to the embodiment of the invention.

FIG. 4 is a diagram showing a construction of a reproducing system of the recording and reproducing apparatus 100 according to the embodiment.

In FIG. 4, reference numeral 111 denotes a reproduction unit for reproducing the data recorded on the magnetic tape T by the circuit of the recording system in FIG. 1; 112 a switch for switching a destination to which the reproduction encoding data is outputted in response to an encoding method discrimination signal that is supplied from the system controller 109; 113 an HD decoding unit for decoding the reproduced HD encoding data by the MPEG system such as MP@HL method, MP@H-14 method, or the like and outputting the HD video signal; 115 a terminal for outputting the decoded HD video signal; 114 a DV decoding unit for decoding the reproduced encoding data by the DV system and outputting the SD video signal; 116 a terminal for outputting the decoded SD video signal; and 117 a sync detection unit for detecting the sync data from the reproduction data outputted from the reproduction unit 111, discriminating the encoding method of the data recorded on the tape T by the pattern of the detected sync data, and outputting the discrimination signal.

The reproducing operation which is executed by the reproducing system in FIG. 4 will be described in detail hereinbelow.

When an instruction to start the reproduction is outputted from the operation switch 110, the system controller 109 instructs the reproduction unit 111 to start the reproduction. The reproduction unit 111 reproduces the data recorded on the magnetic tape T and outputs the reproduction data.

The reproduction data outputted from the reproduction unit 111 is inputted to the sync detection unit 117 and the switch 112. The sync detection unit 117 detects from the reproduction data by sync pattern detection units 117a and 117b either the sync pattern of the DV system or the sync pattern of the HD system different from the sync pattern of the DV system.

When the sync detection unit 117 detects one of those sync patterns, the unit 117 outputs a detection signal indicative of either the DV system or the HD system to the system controller 109. On the basis of the detection signal from the sync detection unit 117, the system controller 109 outputs a discrimination signal of the encoding method to the switch 112.

That is, in the case of the DV system, the reproduced encoding data is outputted to the DV decoding unit 114. The DV decoding unit 114 decodes the inputted encoding data by the DV system and outputs the SD video signal.

In the case of the HD system, the reproduced encoding data is outputted to the HD decoding unit 113. The HD decoding unit 113 decodes the inputted encoding data by the HD system and outputs the HD video signal.

As described above, according to the embodiment, the encoding method of the data recorded on the tape T can be discriminated merely by discriminating the pattern of the sync data in the reproduced data.

Although there are two kinds of data encoding methods in the foregoing embodiment, the invention is not limited to them but can be also easily applied to the case of handling three or more kinds of data encoding methods. Also in such a case, similar effects can be obtained.

The invention can be applied to a system constructed by a plurality of apparatuses (for example, a host computer, an interface apparatus, a recording apparatus, and a reproducing apparatus) or to an apparatus comprising one equipment (for example, a video deck or the like).

The object of the invention can be also accomplished by a method whereby a storing medium (or recording medium) in which program codes of software for realizing the functions of the embodiment mentioned above have been recorded is supplied to a system or an apparatus and a computer (or a CPU or an MPU) of the system or the apparatus reads out and executes the program codes stored in the storing medium. In this case, the program codes themselves read out from the storing medium realize the functions of the embodiment mentioned above. The storing medium in which the program codes have been stored constructs the invention. The invention incorporates not only a case where the computer executes the read-out program codes, so that the functions of the embodiment mentioned above are realized but also a case where an operating system (OS) or the like which is operating on the computer executes a part or all of actual processes on the basis of instructions of the program codes and the functions of the embodiment mentioned above are realized by those processes. As a storing medium for storing the program codes, for example, a flexible disk, a hard disk, a ROM, a RAM, a magnetic tape, a non-volatile memory card, a CD-ROM, a CD-R, a DVD, an optical disk, a magnetooptic disk, an MO, or the like can be used.

Further, the invention also incorporates a case where the program codes readout from the storing medium are written into a memory provided for a function expanding card inserted in a computer or a function expanding unit connected to a computer and, thereafter, a CPU or the like provided for the function expanding card or the function expanding unit executes a part or all of actual processes on the basis of instructions of the program codes and the functions of the embodiment mentioned above are realized by those processes.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
input means for inputting a high definition image signal and a standard definition image signal;
encoding means for encoding the high definition image signal input by said input means by a first encoding method to output high definition encoded image data, and encoding the standard definition image signal input by said input means by a second encoding method different from the first encoding method to output standard definition encoded image data;
sync data generating means for generating sync data for the high definition image signal and sync data for the standard definition image signal, the sync data for the standard definition image signal having a different sync pattern from the sync data for the high definition image signal so that the encoding method of an image signal recorded on a recording medium is discriminated by the sync data;
mode setting means for setting one of a high definition image recording mode in which the high definition image signal input by said input means is recorded and a standard definition image recording mode in which the standard definition image signal input by said input means is recorded;
control means for controlling said sync data generating means in accordance with the recording mode set by said mode setting means so as to generate the sync data for the high definition image signal in the high definition image recording mode and to generate the sync data for the standard definition image signal in the standard definition image recording mode; and
recording means for forming a plurality of sync blocks by adding the sync data for the high definition image signal and ID data for discriminating each of the plurality of sync blocks to each of a predetermined amount of the high definition encoded image data and recording an encoded data stream constructed by the plurality of sync blocks of the high definition encoded image data onto the recording medium in the high definition image recording mode, and for forming a plurality of sync blocks by adding the sync data for the standard definition image signal and the ID data to each of a predetermined amount of the standard definition encoded image data and recording an encoded data stream constructed by the plurality of sync blocks of the standard definition encoded image data onto the recording medium in the standard definition image recording mode.

2. An apparatus according to claim 1, wherein the first encoding method is an MP@HL method or an MP@H-14 method in an MPEG encoding system and the second encoding method is a DV format method specified by the HD Digital VCR Council.

3. An apparatus according to claim 1, further comprising:
reproducing means for reproducing the encoded data stream from the recording medium;
decoding means for decoding the high definition encoded image data and the standard definition encoded image data in the encoded data stream reproduced by said reproducing means;
sync data detecting means for detecting the sync data from a plurality of sync blocks in the encoded data stream reproduced by said reproducing means and discriminating the encoding method of the encoded image data in the encoded data stream reproduced by said reproducing means on the basis of the sync pattern of the detected sync data; and
control means for controlling said decoding means on the basis of the encoding method discriminated by said sync data detecting means.

4. An apparatus according to claim 1, wherein the recording medium is a magnetic tape.

5. A reproducing apparatus comprising:
reproducing means for reproducing from a recording medium an encoded data stream constructed by a plurality of sync blocks each including encoded image data encoded by a first encoding method or a second encoding method different from the first encoded method, ID data for discriminating each of the plurality of sync blocks, and sync data having different sync patterns according to the encoding method of the encoded image data;

decoding means for decoding, by a decoding method corresponding to the first encoding method or the second encoding method, the encoded image data in the encoded data stream reproduced by said reproducing means;

sync data detecting means for detecting sync data from a plurality of sync blocks in the encoded data stream reproduced by said reproducing means and discriminating the encoding method of the encoded image data in the encoded data stream reproduced by said reproducing means on the basis of the sync pattern of the detected sync data; and control means for controlling said decoding means so as to decode the encoded image data corresponding to the encoding method discriminated by said sync data detecting means.

6. An apparatus according to claim 5, wherein the first encoding method comprises a high quality encoding method of encoding a video signal of high quality and the second encoding method comprises a standard quality encoding method of encoding a video signal of standard quality.

7. An apparatus according to claim 6, wherein the first encoding method is an MP@HL method or an MP@H-14 method in an MPEG encoding system and the second encoding method is a DV format method specified by the HD Digital VCR Council.

8. An apparatus according to claim 5, wherein the recording medium is a magnetic tape.

9. A recording method comprising:

an input step of inputting a high definition image signal and a standard definition image signal;

an encoding step of encoding the high definition image signal input in said input step by a first encoding method to output high definition encoded image data, and encoding the standard definition image signal input in said input step by a second encoding method different from the first encoding method to output standard definition encoded image data;

a sync data generating step of generating sync data for the high definition image signal and sync data for the standard definition image signal, the sync data for the standard definition image signal having a different sync pattern from the sync data for the high definition image signal so that the encoding method of an image signal recorded on a recording medium is discriminated by the sync data;

a mode setting step of setting one of a high definition image recording mode in which the high definition image signal input in said input step is recorded and a standard definition image recording mode in which the standard definition image signal input in said input step is recorded;

a control step of controlling said sync data generating step in accordance with the recording mode set by said mode setting means so as to generate the sync data for the high definition image signal in the high definition image recording mode and to generate the sync data for the standard definition image signal in the standard definition image recording mode; and a recording step of forming a plurality of sync blocks by adding the sync data for the high definition image signal and ID data for discriminating each of the plurality of sync blocks to each of a predetermined amount of the high definition encoded image data and recording an encoded data stream constructed by the plurality of sync blocks of the high definition encoded image data onto the recording medium in the high definition image recording mode, and for forming a plurality of sync blocks by adding the sync data for the standard definition image signal and the ID data to each of a predetermined amount of the standard definition encoded image data and recording an encoded data stream constructed by the plurality of sync blocks of the standard definition encoded image data onto the recording medium in the standard definition image recording mode.

10. An apparatus according to claim 9, wherein the first encoding method is an MP@HL method or an MP@H-14 method in an MPEG encoding system and the second encoding method is a DV format method specified by the HD Digital VCR Council.

11. A method according to claim 10, wherein the recording medium is a magnetic tape.

12. A reproducing method comprising:

a reproducing step of reproducing from a recording medium an encoded data stream constructed by a plurality of sync blocks each including encoded image data encoded by a first encoding method or a second encoding method different from the first encoding method, ID data for discriminating each of the plurality of sync blocks, and sync data having different sync patterns according to the encoding method of the encoded image data;

a sync data detecting step of detecting sync data from a plurality of sync blocks in the encoded data stream reproduced in said reproducing step and discriminating an encoding method of the encoded image data in the encoded data stream reproduced in said reproducing step on the basis of the sync pattern of the detected sync data; and a decoding step of decoding the encoded image data corresponding to the encoding method detected in said sync data detecting step.

13. A method according to claim 12, wherein the first encoding method comprises at least one of a high quality encoding method of encoding a video signal of high quality and the second encoding method comprises a standard quality encoding method of encoding a video signal of standard quality.

14. A method according to claim 13, wherein the first encoding method is an MP@HL method or an MP@H-14 method in an MPEG encoding system and the second encoding method is a DV format method specified by the HD Digital VCR Council.

15. A method according to claim 12, wherein the recording medium is a magnetic tape.

* * * * *